(12) United States Patent
Wang et al.

(10) Patent No.: US 12,012,502 B2
(45) Date of Patent: Jun. 18, 2024

(54) VINYL-MODIFIED NANOFILLERS AS INTERFACIAL COMPATIBILIZERS AND METHOD FOR PRODUCING COMPATIBILIZED POLYMER BLENDS

(71) Applicant: Zhejiang Normal University, Jinhua (CN)

(72) Inventors: Bin Wang, Jinhua (CN); Xiping Li, Jinhua (CN); Hesheng Liu, Jinhua (CN)

(73) Assignee: Zhejiang Normal University, Jinhua (CN)

( * ) Notice: Subject to any disclaimer, the term of this patent is extended or adjusted under 35 U.S.C. 154(b) by 122 days.

(21) Appl. No.: 17/867,964

(22) Filed: Jul. 19, 2022

(65) Prior Publication Data
US 2023/0026484 A1    Jan. 26, 2023

(30) Foreign Application Priority Data
Jul. 22, 2021 (CN) .......................... 202110829008.9

(51) Int. Cl.
| | |
|---|---|
| C08K 9/06 | (2006.01) |
| C08G 63/08 | (2006.01) |
| C08K 3/04 | (2006.01) |
| C08K 5/14 | (2006.01) |
| C08K 5/5425 | (2006.01) |

(52) U.S. Cl.
CPC .............. *C08K 9/06* (2013.01); *C08G 63/08* (2013.01); *C08K 3/041* (2017.05); *C08K 3/042* (2017.05); *C08K 5/14* (2013.01); *C08K 5/5425* (2013.01); *C08K 2201/011* (2013.01)

(58) Field of Classification Search
CPC ... C08K 9/06; C08K 5/14; C08K 3/04; C08K 5/5425; C08G 63/08
USPC ...................................................... 523/212
See application file for complete search history.

(56) References Cited

FOREIGN PATENT DOCUMENTS

| | | | |
|---|---|---|---|
| CN | 105017737 A | | 11/2015 |
| CN | 106189128 A | | 12/2016 |
| CN | 108046252 | * | 5/2018 |
| CN | 108314031 A | * | 7/2018 |
| CN | 111875881 A | | 11/2020 |
| WO | WO-2014168979 A1 | * | 10/2014 ............. B29C 70/04 |

OTHER PUBLICATIONS

Wang et al., "Rheology of Nanosilica-Compatibilized Immiscible Polymer Blends: Formation of a "Heterogeneous Network" Facilitated by Interfacially Anchored Hybrid Nanosilica", Marcomolecules, 50: 9494-9506, 2017.
Zhang et al., "Dual Effects of Compatibilizer on the Formation of Oriented Ribbon-Like Dispersed Phase Domains in Polystyrene/Polyamide 6 Blends", Chemical Engineering Science, 178: 146-156, 2018.
Zolali et al., "Toughening of Cocontinuous Polylactide/Polyethylene Blends via an Interfacially Percolated Intermediate Phase", Marcomolecules, 51: 3572-3581, 2018.
First Office Action received for China Patent Application Serial No. CN 202110829008.9 dated Mar. 3, 2022, Original, 6 pages.
First Office Action received for China Patent Application Serial No. CN 202110829008.9 dated Mar. 3, 2022, Translated, 6 pages.

* cited by examiner

*Primary Examiner* — Deve V Hall

(57) ABSTRACT

The present disclosure is related to the field of polymer processing, and, in particular, to a vinyl-modified nanofiller interfacial compatibilizer and a method for producing a compatibilized polymer blend. Vinyl-modified nanofillers can be used together with an initiator as a compatibilizer for polymer blends. The initiator can initiate a free radical reaction between the chains of the polymers in the blend and the vinyl groups on the surface of the vinyl-modified nanofiller, leading to in situ formation of a co-crosslinked polymer and thus compatibilization of the blend as well as improved tensile strength and modulus thereof. Results of examples showed that vinylsilane grafted onto the surface of the vinyl-modified nanofiller makes it possible for the nanofiller to be used as an effective compatibilizer. The vinyl-modified nanofillers can be used as a compatibilizer for various polymer blends systems.

11 Claims, 4 Drawing Sheets

VINYL-MODIFIED NANOFILLERS AS INTERFACIAL COMPATIBILIZERS AND METHOD FOR PRODUCING COMPATIBILIZED POLYMER BLENDS

CROSS REFERENCE TO RELATED APPLICATION

This patent application claims the benefit and priority of Chinese Patent Application No. 202110829008.9, filed on Jul. 22, 2021, the disclosure of which is incorporated by reference herein in its entirety.

TECHNICAL FIELD

The present disclosure is related to the field of polymer processing, and, in particular, to a vinyl-modified nanofiller interfacial compatibilizer and a method for producing a compatibilized polymer blend.

BACKGROUND

Polymer blending is an important and effective approach to develop new polymeric materials with improved properties. However, since the most frequently encountered polymer mixtures of two or more polymers are thermodynamically immiscible, their blends produced by simple blending typically exhibit poor mechanical properties which do not satisfy specific application requirements. In order to obtain polymer blends with excellent performance and high practical utility, modification of the interface between immiscible blend components, i.e., compatibilization, is to be performed.

Generally, compatibilizers are often added to immiscible polymer blends to enhance the miscibility of the polymer blends. Conventional compatibilizers are usually copolymers having a structure similar to those of the polymers in the polymer blends, and when added to the blends, can aggregate at the interface between the polymers and lower the interfacial tension, thereby enhancing the miscibility of the polymer blends. The Favis group reported compatibilization of a polylactic acid (PLA)/linear low density polyethylene (LLDPE) blend by using ethylene-methyl acrylate-glycidyl methacrylate copolymer (EMA-GMA) as a compatibilizer (*Macromolecules* 2018, 51: 3572-3581). They found that the PLA/LLDPE blend compatibilized by using EMA-GMA exhibited a substantially reduced phase size and an impact strength which is approximately 13 times greater than the uncompatibilized PLA/LLDPE blend.

It is becoming increasingly popular to compatibilize immiscible polymer blends by in situ copolymer formation during blending via reaction of reactive compatibilizers with one polymer in the blend. Reactive compatibilizers are generally prepared by grafting an active group which is reactive with one polymer in the blend onto the chain of the other polymer in the blend. During blending, reactive compatibilizers react with the one polymer in the blend to form a copolymer, which acts as an effective compatibilizer to compatibilize the blend (*Chemical Engineering Science* 2018, 17: 8146-156). However, flexible copolymers possibly formed during blending are prone to leave the interface between immiscible blend phases and form micelles, leading to a reduction in compatibilization of the polymer blends.

In addition, nanofillers have been continuously developed as the compatibilizers for immiscible polymer blends. Examples of such nanofillers include nanoclay, silica ($SiO_2$), carbon nanotubes (CNTs), graphene oxide (GO), amino-functionalized carbon quantum dots ($NH_2$-CQDs), and nanocellulose. They can act as compatibilizers during blending to compatibilize the polymer blends and reduce the phase size. However, the interfacial interactions between the nanofillers and the polymers in the blend, as well as between the polymers themselves, are weak. To solve this problem, it has been proposed to modify the surface of nanofillers by introducing thereonto polymer chains having a structure similar to the structure of each polymer component in the blend (*Macromolecules* 2017, 50: 9494-9506). In this way, the interfacial interaction between the nanofillers and each one of the polymers in the blend will be enhanced because of chain entanglements between the polymer chains on the surface of the nanofillers and the molecular chains of the polymers in the blend. However, the structure of the polymer chain introduced onto the surface of the nanofillers and reactions for the synthesis thereof need to be specially designed depending on the structures of the polymers in the polymer blend. This is complex and difficult to implement, leading to a narrow variety of application areas and high cost.

SUMMARY

Among the objectives, the present disclosure is to provide the use of a vinyl-modified nanofiller as a compatibilizer for polymer blends, and a method for producing a compatibilized polymer blend. The inventors have found that vinyl-modified nanofillers can surprisingly be used as a compatibilizer for various polymer blend systems without the need for designing of structure and reactions for the synthesis of polymer chains for different polymer blends, as would otherwise be required by prior art. Therefore, low cost can be realized.

Accordingly, one objective of the present disclosure is realized by use of a vinyl-modified nanofiller as a compatibilizer for polymer blends, which is used together with an initiator.

The compatibilizer and the initiator are preferably used at a mass ratio of from 1:4 to 20:1.

The initiator is preferably an organic peroxide.

The vinyl-modified nanofiller preferably includes vinyl-modified graphene (V-GN) and/or vinyl-modified carbon nanotubes (V-CNTs).

The V-GN is preferably prepared by mixing vinylsilane and an aqueous suspension of graphene oxide (GO) to conduct a condensation reaction to form vinyl-modified GO (V-GO), which is then subjected to hydrothermal reduction to form the V-GN.

The V-CNTs are preferably prepared by mixing CNTs, an aqueous sodium hydroxide solution, and hydrogen peroxide to conduct a substitution reaction for introduction of a hydroxyl group into the CNTs to form hydroxylated CNTs, which are then subjected to a condensation reaction with vinylsilane to form V-CNTs.

Another objective of the present disclosure is realized by a polymer blend comprising at least two polymers selected from the group consisting of polyolefins, aliphatic polyesters, and polyamides, a vinyl-modified nanofiller as a compatibilizer, and an initiator, where the compatibilizer is present in an amount of 0.2 to 2 wt % with respect to the total amount of the polymers, and the initiator is present in an amount of 0.1 to 0.8 wt % with respect to the total amount of the polymers.

The vinyl-modified nanofiller preferably includes V-GN and/or V-CNTs.

The polyolefins preferably include polyethylene (PE) and/or polyethylene oxide (PEO). The aliphatic polyesters preferably include one or more of polycaprolactone (PCL), polylactic acid (PLA), polybutylene succinate (PBS), and poly(butylene adipate-co-terephthalate) (PBAT). The polyamides preferably include polyamide 6.

The polymer blend is preferably a blend of PCL and PLA, a blend of PE and PLA, a blend of PLA and PBS, a blend of PLA and PBAT, a blend of PEO and PLA, or a blend of polyolefin and polyamide 6.

A further objective of the present disclosure is realized by a method for preparing the polymer blend as described above, the method comprising mixing the polymers, the compatibilizer, and the initiator to form a mixture and then melt compounding the mixture.

The present disclosure provides use of a vinyl-modified nanofiller as a compatibilizer for polymer blends, which is used together with an initiator. This disclosure is the first to utilize vinyl-modified nanofiller as a compatibilizer for polymer blends, which was found to be capable of forming covalent bonds with the polymers in an immiscible polymer blend at the interfaces between it and the polymers and thus enhancing the interfacial interaction and compatibilizing the polymer blends, when it was used together with an initiator. It is believed that the formation of covalent bonds at the interfaces is due to a free radical reaction initiated by the initiator. Therefore, nanofiller materials can have a broader variety of application areas in the polymer processing field. Further, it was found that the use of vinyl-modified nanofiller materials as a compatibilizer can improve the mechanical properties of the polymer blends. Vinyl-modified nanofiller materials can be used as a compatibilizer for various polymer blends systems without the need for designing of the structure of and reactions for the synthesis of the polymer chains for different polymer blends as would otherwise be required by prior art. Therefore, low cost is able to be realized, and vinyl-modified nanofiller materials are thus suitable to be used in a broader variety of application areas in the polymer processing field.

The method for preparing a vinyl-modified nanofiller according to the present disclosure is simple, easy to perform, and highly productive, and can be applied on an industrial scale. Therefore, it is a very promising method.

The present disclosure further provides a polymer blend comprising at least two polymers selected from the group consisting of polyolefins, aliphatic polyesters, and polyamides, a vinyl-modified nanofiller as a compatibilizer, and an initiator, where the compatibilizer is present in an amount of 0.2 to 2 wt % with respect to the total amount of the polymers, and the initiator is present in an amount of 0.1 to 0.8 wt % with respect to the total amount of the polymers. The initiator initiates a free radical chain reaction between the chains of the polymers and the vinyl groups on the surface of the vinyl-modified nanofiller, thereby causing in situ formation of a co-crosslinked polymer product and thus compatibilization of the polymer blend. During the reaction, covalent bonds are formed between the polymers and the nanofiller, and there also occurs entanglement between the chains of the polymers. These can effectively enhance the interfacial interaction between the polymers in the polymer blend, and increase tensile strength and modulus of the blend.

Results of examples showed that vinyl-modified nanofillers, when used together with an initiator as a compatibilizer for polymer blends, were able to enhance interfacial interaction between the polymers in the blend and compatibilize the blend. Results showed that the polymer blends prepared in the examples had a tensile strength of from 26.1±1 to 36.1±2.6 MPa and a Young's modulus of from 697.7±30.1 to 1364.9±85.6 MPa.

BRIEF DESCRIPTION OF THE DRAWINGS

The embodiments of the present disclosure and the prior art will now be described more clearly with reference to figures, which are briefly described below and merely describe embodiment examples of the disclosure.

DETAILED DESCRIPTION

Figure 1:
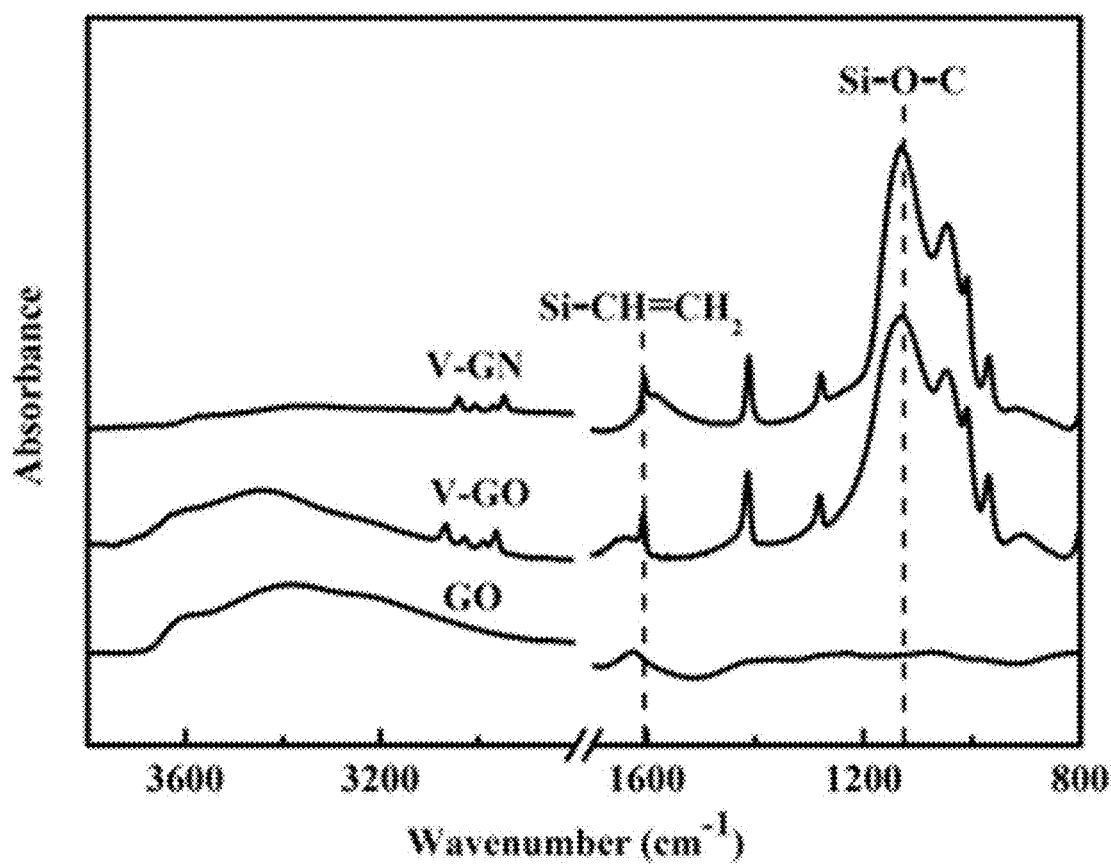
FIG. 1 is a graph showing infrared (IR) spectra of V-GN, V-GO, and GO prepared in Example 1.

The present disclosure provides a new use of a vinyl-modified nanofiller as a compatibilizer for polymer blends, which is used together with an initiator.

The compatibilizer and the initiator are preferably used at a mass ratio of from 1:4 to 20:1, more preferably from 5:2 to 10:1.

The initiator is preferably an organic peroxide, more preferably bis(tert-butyldioxyisopropyl)benzene (BIPB).

The vinyl-modified nanofiller preferably includes V-GN and/or V-CNTs.

The V-GN is preferably prepared by mixing vinylsilane and an aqueous suspension of GO to conduct a condensation reaction to form V-GO, which is then subjected to hydrothermal reduction to form the V-GN.

The vinylsilane preferably includes one or more selected from the group consisting of vinyltrichlorosilane, vinyltriethoxysilane (VTES), and vinyltrimethoxysilane (VTMS). The aqueous suspension of GO preferably has a GO concentration of from 2 to 10 mg/mL. The graphene oxide GO used preferably has a thickness of from 0.9 to 5 nm. The ratio of mass of the GO in the aqueous suspension of GO to volume of the vinylsilane is preferably from 0.1 to 0.6 g/mL, more preferably 0.33 g/mL. The condensation reaction is preferably conducted at a temperature of from 50 to 90° C., more preferably at 75° C., for a period of time of from 0.5 to 8 h, more preferably from 2.5 to 3 h. In a particular embodiment of the process for the preparation of V-GN, vinylsilane is added dropwise to a stirred aqueous suspension of GO, and after completion of the addition, the mixture is transferred to an oil bath and heated therein to a predetermined temperature at which the condensation reaction is conducted. The condensation reaction is preferably catalyzed by hydrochloric acid (HCl), such as, concentrated HCl. The HCl and the vinylsilane are preferably used at a mass ratio of from 1:10 to 1:4, more preferably from 1:8 to 1:6, further preferably 1:7.

In this particular embodiment of the process for the preparation of V-GN, the reaction solution resulting from the condensation reaction is centrifuged to collect a precipitate, i.e., V-GO, which is then put in distilled water and stirred to form a uniform beige suspension. The suspension is then subjected to hydrothermal reduction.

The hydrothermal reduction is preferably conducted at a temperature of from 90 to 180° C. for a period of time of from 1 to 6 h. The hydrothermal reduction is preferably conducted in a Teflon-lined stainless steel autoclave.

In this particular embodiment of the process for the preparation of V-GN, after completion of the hydrothermal reduction, the resulting product is allowed to cool to room temperature and then freeze dried so as to obtain the V-GN.

The V-CNTs are preferably prepared by mixing CNTs, an aqueous sodium hydroxide solution, and hydrogen peroxide to conduct a substitution reaction for introduction of a hydroxyl group into the CNTs to form hydroxylated CNTs, which are then subjected to a condensation reaction with vinylsilane to form the V-CNTs.

The CNTs are preferably single-walled or multi-walled CNTs. The CNTs preferably have a diameter of from 10 to 50 nm, more preferably 20 nm, and a length to diameter ratio of from 200 to 1000, more preferably 500. The aqueous sodium hydroxide solution preferably has a molar concentration of from 1 to 10 mol/L, more preferably 4 mol/L. The ratio of mass of the CNTs to volume of the aqueous sodium hydroxide solution is preferably from 0.5 to 5 mg/mL, more preferably 2.5 mg/mL. The hydrogen peroxide is employed as 30 wt % aqueous $H_2O_2$. The substitution reaction is preferably conducted at room temperature for a period of time of from 12 to 48 h.

After completion of the substitution reaction, the resulting reaction solution is preferably centrifuged to give hydroxylated CNTs, which are then subjected to a condensation reaction with vinylsilane.

The vinylsilane used for the preparation of V-CNTs may be those used for the preparation of V-GN as described above and is not described further. The ratio of mass of the hydroxylated CNTs to volume of the vinylsilane is preferably from 0.05 to 0.5 g/mL, more preferably from 0.1 to 0.3 g/mL, further preferably 0.2 g/mL. The condensation reaction between the hydroxylated CNTs and the vinylsilane is preferably conducted at a temperature of from 50 to 90° C., more preferably from 75 to 80° C., for a period of time of from 0.5 to 8 h, more preferably 3 h. In a particular embodiment, vinyltrichlorosilane is added dropwise to an aqueous solution of the hydroxylated CNTs, and after completion of the addition, the mixture is heated to 80° C. to conduct the condensation reaction.

After completion of the condensation reaction, the resulting reaction solution is preferably centrifuged to collect a precipitate and the precipitate is freeze dried to obtain the V-CNTs.

The present disclosure also provides a polymer blend comprising at least two polymers selected from the group consisting of polyolefins, aliphatic polyesters, and polyamides, a vinyl-modified nanofiller as a compatibilizer, and an initiator.

The polyolefins preferably include PE and/or PEO. The aliphatic polyesters preferably include one or more of PCL, PLA, PBS, and PBAT. The polyamides preferably include polyamide 6.

The vinyl-modified nanofiller (namely, the compatibilizer) preferably includes one or more selected from the group consisting of V-GN, V-CNTs, vinyl-modified hydrophilic silica nanoparticles, vinyl-modified nanocellulose, and vinyl-modified hydrotalcite nanosheets. The compatibilizer is present in an amount of from 0.2 to 2 wt %, preferably from 0.5 to 2 wt %, with respect to the total amount of the polymers.

The initiator is preferably an organic peroxide, more preferably BIPB. The initiator is present in an amount of from 0.1 to 0.8 wt %, preferably 0.2 to 0.5 wt %, with respect to the total amount of the polymers.

The polymer blend is preferably a blend of PCL and PLA, a blend of PE and PLA, a blend of PLA and PBS, a blend of PLA and PBAT, a blend of PEO and PLA, or a blend of polyolefin and polyamide 6. The blending ratio between the polymer components in the polymer blend is not particularly limited. When the polymer blend is a blend of two different polymers, the blending ratio between the two polymers is preferably (1-5):(5-9). Taking the PCL/PLA blend as an example, the mass ratio of PCL to PLA or PLA to PCL is preferably (1-5):(5-9).

The present disclosure further provides a method for preparing the polymer blend as described above, the method comprising mixing the polymers, the compatibilizer, and the initiator to form a mixture and then melt compounding the mixture.

The mixing is preferably performed by a dry mixing process. In an embodiment where a blend of two different polymers, a first polymer and a second polymer, is prepared, the first and second polymers are preferably dried before the mixing. The drying conditions are not particularly limited as long as the polymers are completely dried. In this embodiment, the blend is preferably prepared by dry mixing the first and second polymers and the vinyl-modified nanofiller to form a mixture, dissolving the initiator in ethanol to form an initiator solution, and adding dropwise the initiator solution to the mixture during the mixing thereof, followed by melt compounding.

The melt compounding is preferably performed at a temperature of from 180 to 220° C. for a period of time of from 5 to 20 min, more preferably 10 min. The melt compounding is preferably performed in a twin screw extruder or in an internal mixer.

The present disclosure will now be described in further detail by way of the following examples, which, however, are not exhaustive and should not be construed as limiting the disclosure.

The starting materials used in the examples are commercially available.

Example 1

500 mL of an aqueous suspension of GO having a concentration of 2 mg/mL was taken and continuously stirred. 4 mL of vinyltrichlorosilane was added dropwise to the stirred suspension. After completion of the addition, the mixture was transferred to an oil bath and heated therein to 75° C. The mixture was reacted at 75° C. for 2.5 h. After completion of the reaction, the resulting reaction solution was allowed to cool to room temperature and then repeatedly centrifuged to collect a precipitate, i.e., V-GO.

The obtained V-GO was put in 500 mL of distilled water and stirred for 2 h to form a uniform suspension. The suspension was charged to a Teflon-lined stainless steel autoclave and then subjected to hydrothermal reduction at 150° C. for 2.5 h. After the autoclave was allowed to cool to room temperature, the resulting reaction solution was centrifuged to give a black solid precipitate. The precipitate was freeze dried to obtain V-GN.

IR spectra of the V-GN, V-GO, and GO prepared in this example were measured, and the spectra as shown in FIG. 1 were obtained.

The IR spectrum of the V-GO showed absorption bands at 1126 and 1601 cm$^{-1}$ confirming that the vinylsilane had been successfully grafted onto the surface of the GO. The IR spectrum of the V-GN also showed absorption bands at 1126 and 1601 cm$^{-1}$, which showed no significant change in shape compared with those of the V-GO. This indicates that during the hydrothermal reduction the V-GO structure was not disturbed and the vinyl groups were still stably held on the surface thereof.

Figure 2A:
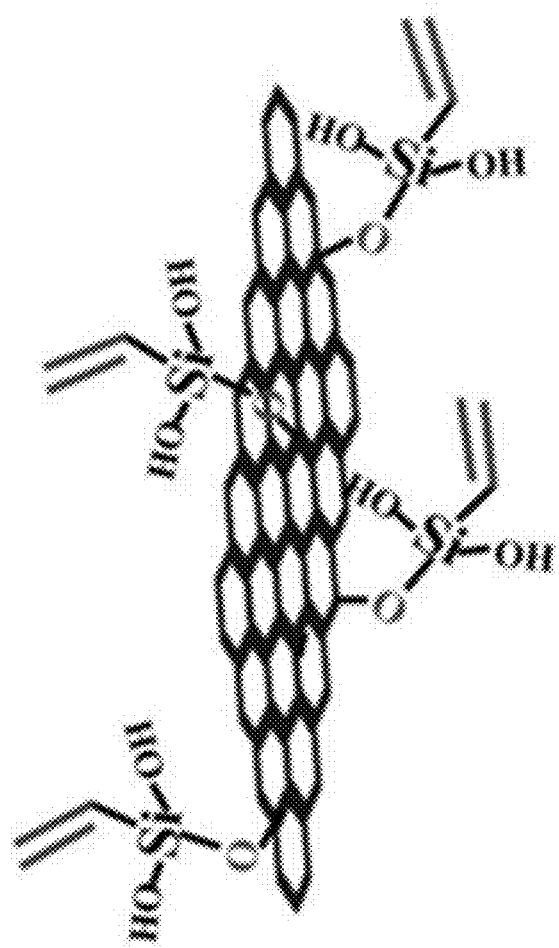
FIG. 2 shows (a) a schematic of a structure of, and (b) a transmission electron micrograph (TEM) of V-GN prepared in Example 1.
Figure 2B:
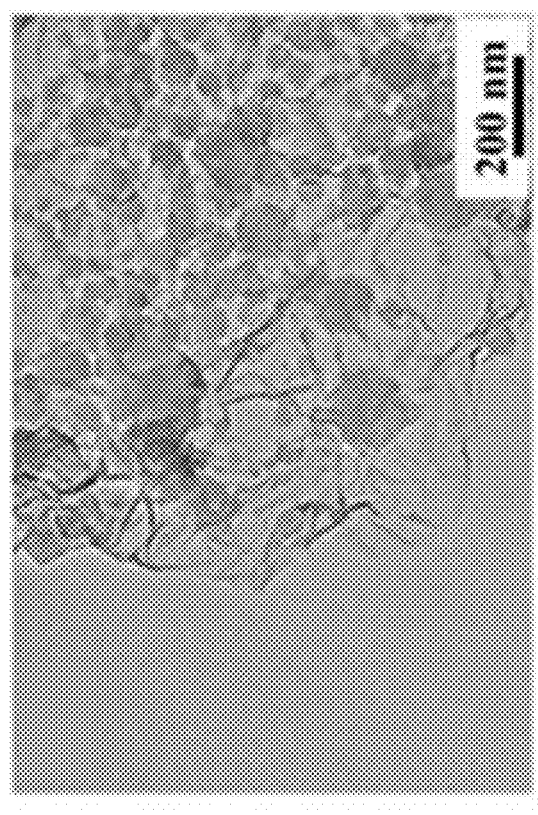

FIG. 2(a) shows a schematic of a structure of, and FIG. 2(b) a TEM image of the V-GN prepared in this Example. In FIG. 2(b), dark "round spots" can be observed on the surface of the GN sheets. This is believed to be due to the silicon element contained in the vinylsilane. This indicates that the vinylsilane had been stably grafted onto the GN surface, which makes it possible for the so obtained V-GN to be used as an effective compatibilizer for immiscible polymer blends.

Example 2

The V-GN prepared in Example 1 was employed as a compatibilizer.

25 g of PCL and 25 g of PLA were completely dried and then dry mixed with 0.5 g of the V-GN. During the mixing, 0.1 g of BIPB dissolved in a small volume of ethanol was added dropwise. The well-mixed dry product was added to an internal mixer and melt compounded at 180° C. for 10 min to obtain a PCL/PLA/V-GN/BIPB blend (50:50:1:0.2).

Comparative Example 1

A PCL/PLA/V-GN (50:50:1) blend was prepared in the same method as in Example 2 except that the initiator was not added.

Figures 3A, 3B:
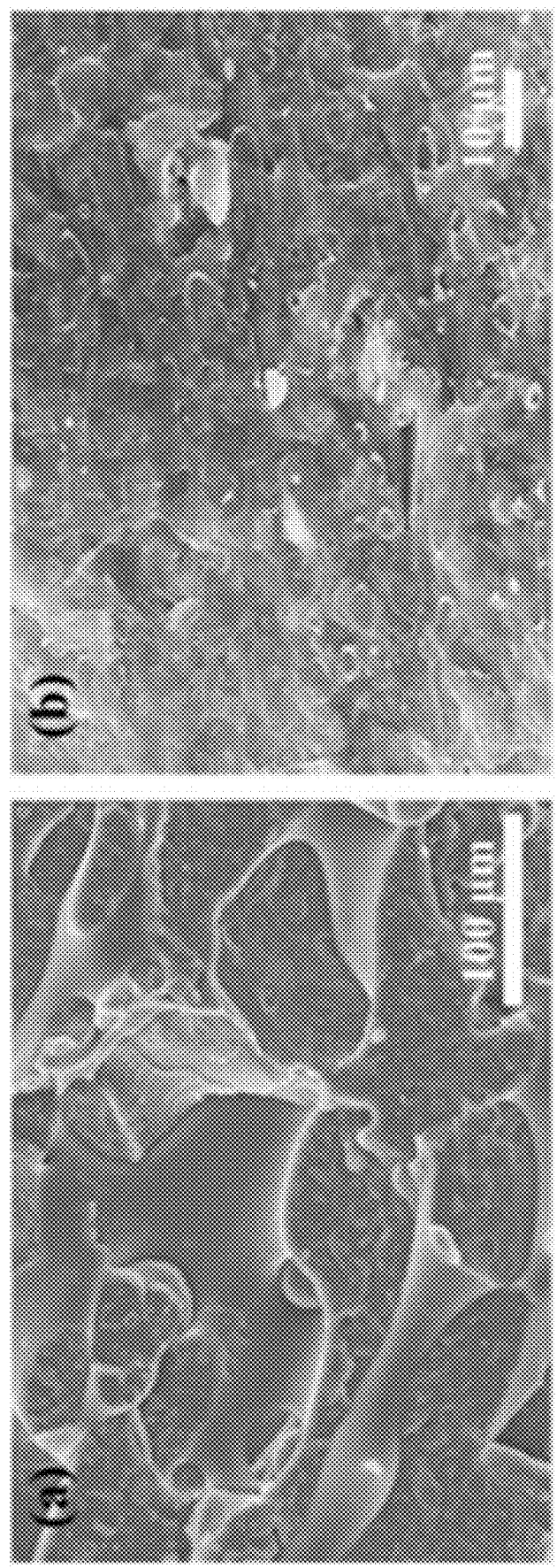
FIG. 3(a) shows a scanning electron micrograph (SEM) of a cross-section of PCL/PLA/V-GN prepared in Comparative Example 1, and FIG. 3(b) a SEM image of a cross-section of PCL/PLA/V-GN/BIPB prepared in Example 2.

Samples of the PCL/PLA/V-GN/BIPB blend prepared in Example 2 and the PCL/PLA/V-GN blend prepared in Comparative Example 1 were observed under a scanning electron microscope (SEM), and the obtained SEM images are shown in FIGS. 3(a) and (b), respectively. As seen from FIGS. 3(a) and (b), both the PCL/PLA/V-GN/BIPB blend and the PCL/PLA/V-GN blend had a co-continuous phase structure, but the former exhibited a substantially reduced phase size compared with that of the latter. This indicates that the use of V-GN as a compatibilizer can enhance the interfacial interaction between PCL and PLA and thus compatibilize the PCL/PLA blend.

The PCL/PLA/V-GN/BIPB blend prepared in Example 2 and the PCL/PLA/V-GN blend prepared in Comparative Example 1 were measured for their mechanical properties. The results showed that the former had a tensile strength of 34.5±2.1 MPa and a Young's modulus of 826.7±34.9 MPa, while the latter had a tensile strength of 14.5±2.2 MPa and a Young's modulus of 655.8±65.0 MPa.

Example 3

A PCL/PLA/V-GN/BIPB (50:50:0.5:0.2) blend was prepared in the same method as in Example 2 except that 0.25 g of the V-GN was added.

Comparative Example 2

A PCL/PLA/V-GN (50:50:0.5) blend was prepared in the same method as in Example 3 except that the initiator was not added.

The PCL/PLA/V-GN/BIPB blend prepared in Example 3 and the PCL/PLA/V-GN blend prepared in Comparative Example 2 were measured for their mechanical properties. The results showed that the former had a tensile strength of 27.4±3.4 MPa and a Young's modulus of 697.7±30.1 MPa, while the latter had a tensile strength of 17.8±1.9 MPa and a Young's modulus of 645.5±55.3 MPa.

Example 4

500 mL of an aqueous suspension of GO having a concentration of 2 mg/mL was taken and continuously stirred. 2 mL concentrated HCl was added to the stirred suspension in one charge, and 4 mL of VTES was added dropwise. After completion of the addition, the mixture was heated to 80° C. and reacted for 2 h. After completion of the reaction, the resulting reaction solution was allowed to cool to room temperature and then repeatedly centrifuged to collect a precipitate, i.e., V-GO. The obtained V-GO was put in 500 mL of distilled water and stirred for 2 h to form a uniform suspension. The suspension was charged to a Teflon-lined stainless steel autoclave and then subjected to hydrothermal reduction at 150° C. for 3 h. After the autoclave was allowed to cool to room temperature, a black solid was obtained. The obtained solid was freeze dried to give V-GN.

Example 5

The V-GN prepared in Example 4 was employed as a compatibilizer.

25 g of PCL and 25 g of PLA were taken and completely dried and then dry mixed with 1 g of the V-GN. During the mixing, 0.1 g of BIPB dissolved in a small volume of ethanol was added dropwise. The well-mixed dry product was added to an internal mixer and melt compounded at 180° C. for 10 min to obtain a PCL/PLA/V-GN/BIPB blend (50:50:2:0.2).

Comparative Example 3

A PCL/PLA/V-GN (50:50:2) blend was prepared in the same method as in Example 5 except that the initiator was not added.

The PCL/PLA/V-GN/BIPB blend prepared in Example 5 and the PCL/PLA/V-GN blend prepared in Comparative Example 3 were measured for their mechanical properties. The results showed that the former had a tensile strength of 36.1±2.6 MPa and a Young's modulus of 909.1±31.5 MPa, while the latter had a tensile strength of 12.9±2.3 MPa and a Young's modulus of 619.5±27.9 MPa.

Example 6

V-GN was prepared in the same method as in Example 4 except that VTMS was used instead of VTES.

Example 7

A PCL/PLA/V-GN/BIPB (50:50:1:0.2) blend was prepared in the same method as in Example 2 except that the V-GN prepared in Example 6 was employed instead of the V-GN prepared in Example 1.

Comparative Example 4

A PCL/PLA/V-GN (50:50:1) blend was prepared in the same method as in Example 7 except that the initiator was not added.

The PCL/PLA/V-GN/BIPB blend prepared in Example 7 and the PCL/PLA/V-GN blend prepared in Comparative Example 4 were measured for their mechanical properties.

The results showed that the former had a tensile strength of 30.5±1.8 MPa and a Young's modulus of 811.3±28.6 MPa, while the latter had a tensile strength of 14.8±3.0 MPa and a Young's modulus of 660.9±30.6 MPa.

Example 8

1 g of CNTs having a diameter of 20 nm and a length to diameter ratio of 500 were taken, poured into 400 mL of 4 mol/L aqueous solution of NaOH and continuously stirred. 10 mL of 30 wt % aqueous $H_2O_2$ was added dropwise thereto as a catalyst. The mixture was stirred and reacted at room temperature for 12 h. After completion of the reaction, the resulting reaction solution was repeatedly centrifuged to give hydroxylated CNTs. To an aqueous solution of the hydroxylated CNTs was dropwise added 5 mL of vinyltrichlorosilane. The mixture was heated to 80° C. and reacted for 2 h. After completion of the reaction, the reaction solution was allowed to cool to room temperature, and repeatedly centrifuged to collect a precipitate. The precipitate was freeze dried to give V-CNTs.

Figure 4:
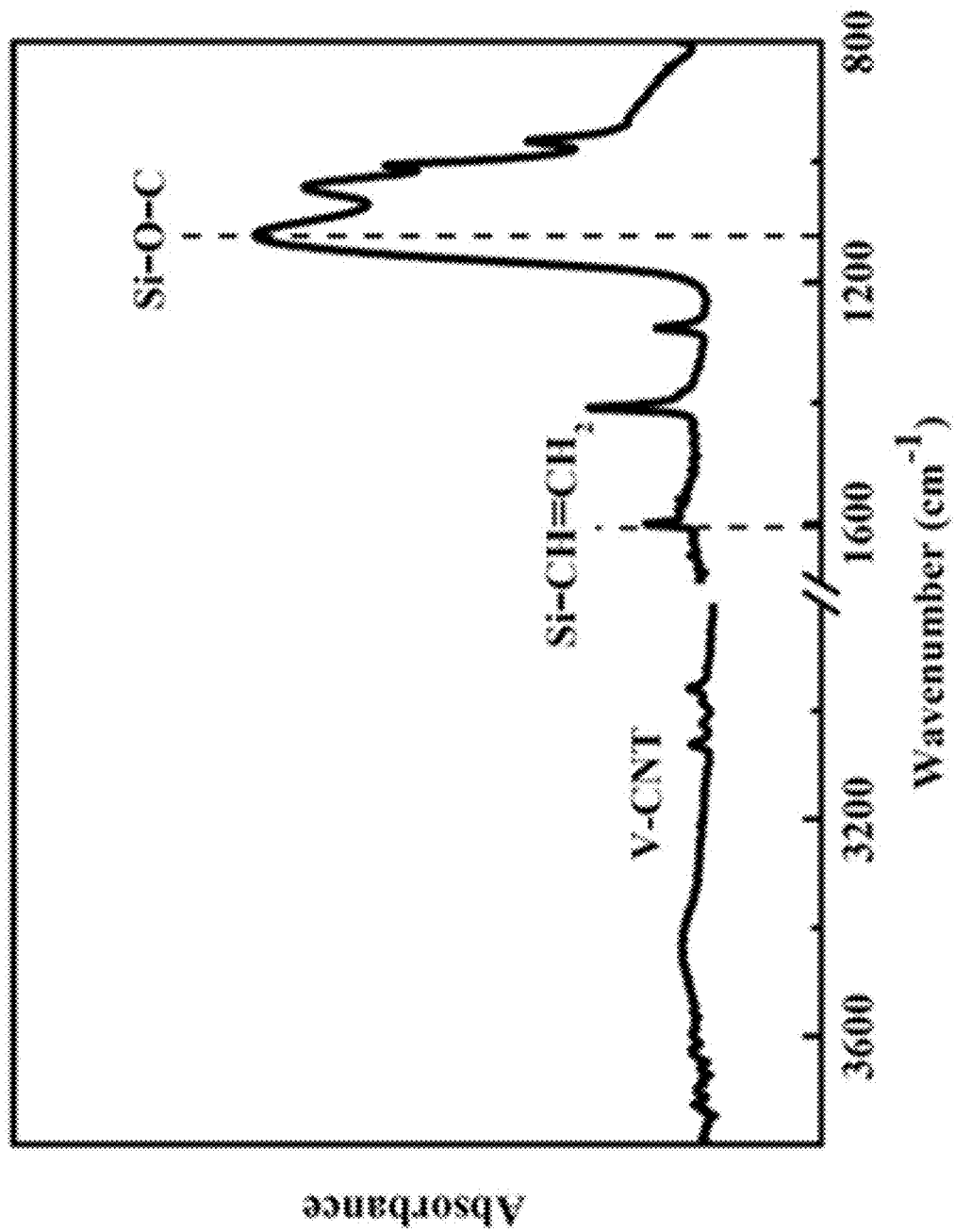
FIG. 4 is a graph showing an IR spectrum of V-CNTs prepared in Example 8.

IR spectrum of the V-CNTs prepared in this example was measured, and the spectrum as shown in FIG. 4 was obtained.

As seen from FIG. 4, the IR spectrum of the V-CNTs showed absorption bands at 1126 and 1601 cm$^{-1}$ confirming that the vinylsilane had been successfully grafted onto the surface of CNTs.

Example 9

25 g of PE and 25 g of PLA were taken and completely dried and then dry mixed with 1 g of the V-CNTs. During the mixing, 0.1 g of BIPB dissolved in a small volume of ethanol was added dropwise. The well-mixed dry product was added to an internal mixer and melt compounded at 200° C. for 10 min to obtain a PE/PLA/V-CNTs/BIPB blend (50:50:2:0.2).

Comparative Example 5

A PE/PLA/CNTs/BIPB blend (50:50:2:0.2) was prepared in the same method as in Example 9 except that unmodified CNTs were employed instead of the V-CNTs.

The PE/PLA/V-CNTs/BIPB blend prepared in Example 9 and the PE/PLA/CNTs/BIPB blend prepared in Comparative Example 5 were measured for their mechanical properties. The results showed that the former had a tensile strength of 26.1±1.0 MPa and a Young's modulus of 1364.9±85.6 MPa, while the latter had a tensile strength of 15.8±1.8 MPa and a Young's modulus of 1173.0±41.8 MPa.

From the results described above, it can be seen that the polymer blends compatibilized by vinyl-modified nanofillers had a co-continuous phase structure and exhibited a substantially reduced phase size as well as higher tensile strength and Young's modulus.

The present disclosure has been described by reference to particular embodiments, which, however, are not exhaustive. Many different embodiments of the present disclosure may be constructed without departing from the spirit and scope of the present disclosure.

What is claimed is:

1. A process of using a vinyl-modified nanofiller as a compatibilizer for polymer blends, which is used together with an initiator,
wherein, the initiator is an organic peroxide, and wherein the vinyl-modified nanofiller comprises vinyl-modified graphene and/or vinyl-modified carbon nanotubes, wherein the vinyl-modified graphene is prepared by mixing vinylsilane and an aqueous suspension of graphene oxide to conduct a condensation reaction to form vinyl-modified graphene oxide, which is then subjected to hydrothermal reduction to form the vinyl-modified graphene,
the process comprising mixing the compatibilizer and the initiator with a polymer to form a mixture and then melt compounding the mixture to form a polymer blend.

2. The process according to claim 1, wherein, the compatibilizer and the initiator are used at a mass ratio of from 1:4 to 20:1.

3. The process according to claim 1, wherein,
the vinyl-modified carbon nanotubes are prepared by mixing carbon nanotubes, an aqueous sodium hydroxide solution, and hydrogen peroxide to conduct a substitution reaction for introduction of a hydroxyl group into the carbon nanotubes to form hydroxylated carbon nanotubes, which are then subjected to a condensation reaction with vinylsilane to form the vinyl-modified carbon nanotubes.

4. A polymer blend, comprising at least two polymers selected from the group consisting of polyolefins, aliphatic polyesters, and polyamides; a vinyl-modified nanofiller as a compatibilizer, and an initiator, wherein the compatibilizer is present in an amount of 0.2 to 2 wt % with respect to the total amount of the polymers, and the initiator is present in an amount of 0.1 to 0.8 wt % with respect to the total amount of the polymers, and wherein, the initiator is an organic peroxide, and wherein the vinyl-modified nanofiller comprises vinyl-modified graphene and/or vinyl-modified carbon nanotubes, wherein the vinyl-modified graphene is prepared by mixing vinylsilane and an aqueous suspension of graphene oxide to conduct a condensation reaction to form vinyl-modified graphene oxide, which is then subjected to hydrothermal reduction to form the vinyl-modified graphene, and wherein, the polymer blend is prepared by mixing the polymers, the compatibilizer, and the initiator to form a mixture and then melt compounding the mixture.

5. The polymer blend according to claim 4, wherein, the polyolefins comprise polyethylene; wherein, the aliphatic polyesters comprise one or more of polycaprolactone, polylactic acid, polybutylene succinate, and poly(butylene adipate-co-terephthalate); and wherein, the polyamides comprise polyamide 6.

6. The polymer blend according to claim 4, wherein, the polymer blend is a blend of polycaprolactone and polylactic acid, a blend of polyethylene and polylactic acid, a blend of polylactic acid and polybutylene succinate, a blend of polylactic acid and poly(butylene adipate-co-terephthalate), a blend of polyethylene oxide and polylactic acid, or a blend of polyolefin and polyamide 6.

7. A method for preparing the polymer blend according to claim 4, comprising: mixing the polymers, the compatibilizer, and the initiator to form a mixture and then melt compounding the mixture.

8. The method for preparing the polymer blend according to claim 7, wherein, the polyolefins comprise polyethylene; wherein, the aliphatic polyesters comprise one or more of polycaprolactone, polylactic acid, polybutylene succinate, and poly(butylene adipate-co-terephthalate); and wherein, the polyamides comprise polyamide 6.

9. The method for preparing the polymer blend according to claim 7, wherein, the polymer blend is a blend of polycaprolactone and polylactic acid, a blend of polyethylene and polylactic acid, a blend of polylactic acid and polybutylene succinate, a blend of polylactic acid and poly(butylene adipate-co-terephthalate), a blend of polyethylene oxide and polylactic acid, or a blend of polyolefin and polyamide 6.

10. The method for preparing the polymer blend according to claim 7, wherein the polymer comprises polyethylene oxide.

11. The polymer blend according to claim 4, wherein, the polymer comprises polyethylene oxide.

* * * * *